J. W. BRILL.
BATH COCK NIPPLE.
APPLICATION FILED SEPT. 8, 1914.

1,165,838.

Patented Dec. 28, 1915.

WITNESSES
*[signatures]*

INVENTOR
JOSEPH W. BRILL
By *[signature]*
ATTORNEY.

UNITED STATES PATENT OFFICE.

JOSEPH W. BRILL, OF LOS ANGELES, CALIFORNIA.

BATH-COCK NIPPLE.

1,165,838.

Specification of Letters Patent. Patented Dec. 28, 1915.

Application filed September 8, 1914. Serial No. 860,538.

*To all whom it may concern:*

Be it known that I, JOSEPH W. BRILL, a citizen of the United States, and residing in Los Angeles, in the county of Los Angeles and State of California, have invented a new and useful Improvement in Bath-Cock Nipples, of which the following is a specification.

This invention relates to bath cock nipples and particularly to a nipple that will be universal in its application.

It is also an object to provide a nipple that will fit any of the numerous types of bath cocks supplied, so that a rubber hose may be attached thereto for auxiliary attachments.

It is a still further object to provide a nipple that is simple in construction and readily applied by unskilled persons.

Figure 1:
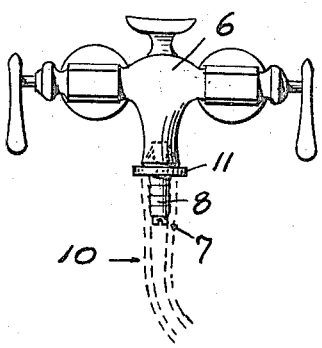
Figure 2:
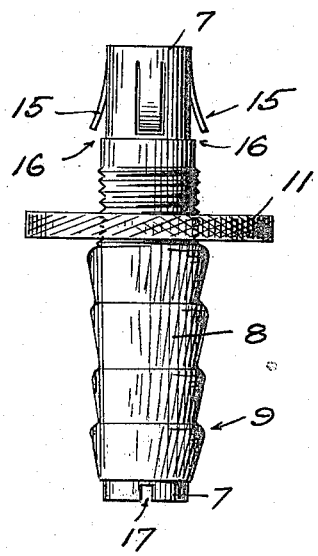
Figure 3:
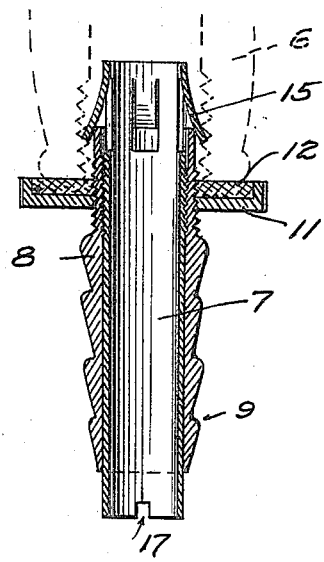
Figure 4:
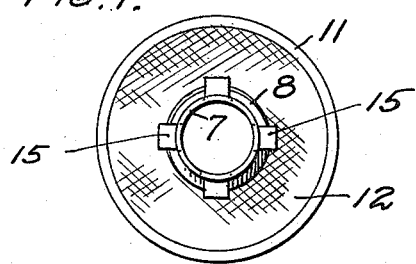
Figure 5:
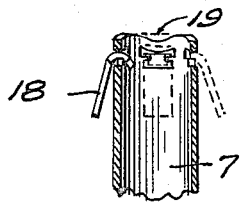

In the drawings accompanying this application, Figure 1 is an elevation of a bath cock showing one application of the improved nipple, Fig. 2 is an elevation of the nipple showing the dogs in the unengaged position. Fig. 3 is a longitudinal section of the nipple showing the dogs thereon engaged with the inside of a cock shown in dotted lines. Fig. 4 is a plan view of the nipple, and Fig. 5 is a detail section of the inner end showing a modification of the dogs or pawls.

In the common installation of all bath fixtures, nipples are commonly supplied or fitted to the outlets, and they are usually lost or intentionally removed, so that when a fixture requiring a nipple is to be installed, difficulty has been found in supplying a nipple that would be universal in its character.

This invention overcomes this difficulty and provides a nipple that is applicable to any of the common forms of nozzles, cocks and faucets, and as shown in the drawings, 6 designates a bath cock to which one of the improved nipples is secured, this nipple consisting of a central tube 7 of metal, which is externally threaded for a portion of its periphery and adapted to engage with the threads on the interior of the outer tube or sleeve 8, whose outer periphery is also threaded for an intermediate portion, the lower end being formed with a series of shoulders 9 which are adapted to be engaged by the rubber tube 10. Threaded to the intermediate portion mentioned, is the washer or disk 11 which is preferably recessed to contain an elastic washer 12 of rubber, or some composition of asbestos.

Returning to the inner tube 7, the upper end is perforated or has formed or upset thereon a number of dogs or pawls 15 which project or extend outwardly, and when the outer tube is screwed up in relation to the same the upper edge 16 of the outer sleeve engages the pawls on their inner faces, and forces them out and into engagement with the teeth on the inner portion of the cock 6. To screw the tube 7, it is provided with the screw slots 17, on the opposite end from the pawls, in which a small coin will fit to act as a screw driver, or holes in which a nail will fit.

Instead of dogs formed from the metal, slots may be cut in the wall and headed pawls 18 inserted therein, and the metal 19 of the tube above the longer portion of the slot pressed in, so that the pawls will be held pivotally therein, as shown in Fig. 5.

The operation of the nipple is simple, the upper portion being inserted a sufficient distance in the cock, the outer sleeve being held in this position while the inner tube is screwed until the outer ends of the pawls are forced into engagement with the threads of the cock. Now the washer is slipped on and screwed up until a water tight joint is made by the washer 12 engaging with the end of the cock. The nipple is now rigidly and efficiently secured to the cock, ready to receive the tube of any auxiliary attachment. By reversing the operations, the nipple may be removed without injury to the parts, and is ready to be applied to any other nippleless cock or faucet.

What I claim is,

1. A nipple having an inner member, an outer member, and outwardly extending means on said inner member adapted to normally engage the inner threads of a bath cock and be forced into locking engagement therewith by the movement of said members in relation to each other.

2. In a nipple, the combination with a bath cock having an internally threaded or flanged outlet, of a tubular member adapted to be inserted therein having spring pawls formed integrally therewith, and an outer embracing member encircling said first member under said pawls and adapted to engage the rim of said bath cock outlet, whereby said pawls are forced outwardly into locking engagement with said internal threads or flange of said outlet.

3. In a nipple, the combination with a bath cock having a threaded or flanged outlet, of a tube adapted to be inserted therein, pawls on said tube, an outer sleeve embracing said tube below said pawls and adapted to engage therewith, and means to move said tube and sleeve in relation to each other, whereby said pawls are forced into engagement with said threads or flange in said cock.

4. In a nipple the combination with a bath cock provided with an internally threaded outlet, of a tube having a plurality of outwardly projecting pawls capable of being extended, a sleeve threaded on said tube and having its upper end adapted to engage said pawls to extend the same, and means on the said sleeve to engage the outer portion of said cock to form a tight joint and lock said pawls and tube in said cock.

5. A nipple formed of a sleeve having threads internally and externally and shoulders to hold a tube thereon, a washer threaded externally on said sleeve, a threaded tube arranged to engage the inner threads of said sleeve, having a screw driving means on the end adjacent the shoulders on said sleeve, and pawls on the opposite end adapted to be extended outwardly by engaging the adjacent end of the sleeve.

JOSEPH W. BRILL.

Witnesses:
W. P. KEENE,
L. S. ROWAN.

Copies of this patent may be obtained for five cents each, by addressing the "Commissioner of Patents, Washington, D. C."